United States Patent [19]

Glicken

[11] 4,002,083
[45] Jan. 11, 1977

[54] BALANCED COMPONENT OPERATIVE WITH AN ASSOCIATED SHAFT FOR RELATIVE POSITIONING MOVEMENT THEREBETWEEN

[76] Inventor: Harry Glicken, 333 Trotting Road, Union, N.J. 07083

[22] Filed: Dec. 11, 1975

[21] Appl. No.: 639,852

[52] U.S. Cl. .................................. 74/459; 74/89.15
[51] Int. Cl.[2] .................. F16H 55/22; F16H 27/02; F16H 1/8; F16H 1/20
[58] Field of Search ........... 74/459, 89.15, 424.8 R, 74/424.8 Z, 424.8 A, 509

[56] References Cited
UNITED STATES PATENTS

| | | | |
|---|---|---|---|
| 3,267,764 | 8/1966 | Berman | 74/459 X |
| 3,277,737 | 10/1966 | Goodman | 74/459 X |
| 3,831,460 | 8/1974 | Linley, Jr. | 74/459 |

*Primary Examiner*—Leonard H. Gerin
*Attorney, Agent, or Firm*—Daniel H. Bobis

[57] ABSTRACT

A component or balanced member for use on a shaft or lead screw having longitudinally extending transport elements has an internal bore with matching threads or lands therein to permit the balanced component to be mounted in operative association with the transport elements for movement to and fro along the given shaft, said component has a plurality of circumferentially spaced longitudinally extending slots having a length less than the length of the component so as to define therebetween a plurality of spaced connecting members each disposed between the ends of the component, and a resilient compression assembly is disposed about the medial section of the component for exerting a force on the medial section of each of the connecting members to adjustably fix the predetermined torque required to move the component when it is in assembled position on the associated shaft. On a shaft or lead screw that is longitudinally grooved or has helical threads with a relatively low lead angle the slots in the component are best disposed parallel to the axis of the component. Conversely when the transport elements on the shaft or lead screw has helical threads with a relatively high lead angle, the slots on the component are disposed to lie either parallel to the lead angle of the helical thread or have sections thereon parallel to the lead angle and preferably medial sections parallel to the axis of the shaft or lead screw.

Additionally a positioning device including a shaft or lead screw having longitudinally extending transport elements in combination with a balanced component, as above described, mounted for movement to and fro thereon.

31 Claims, 26 Drawing Figures

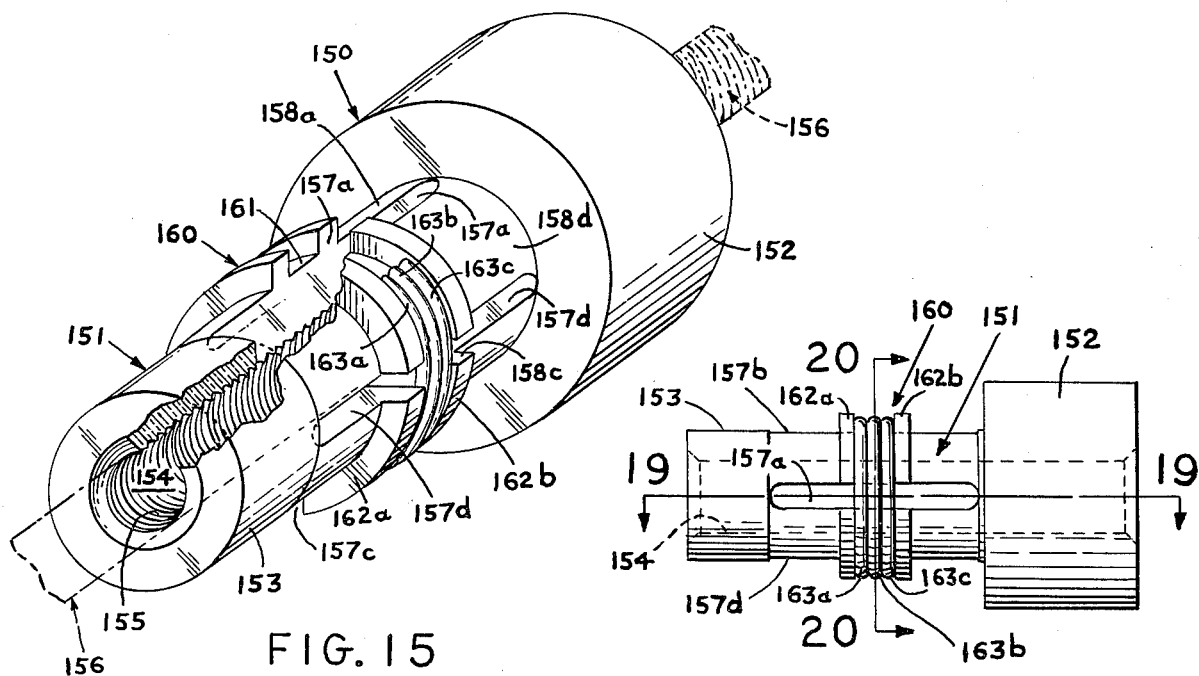
FIG. 15  FIG. 16
FIG. 17  FIG. 18  FIG. 19
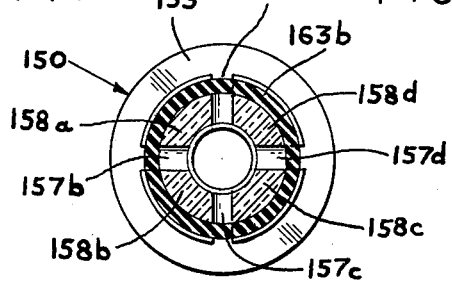
FIG. 20

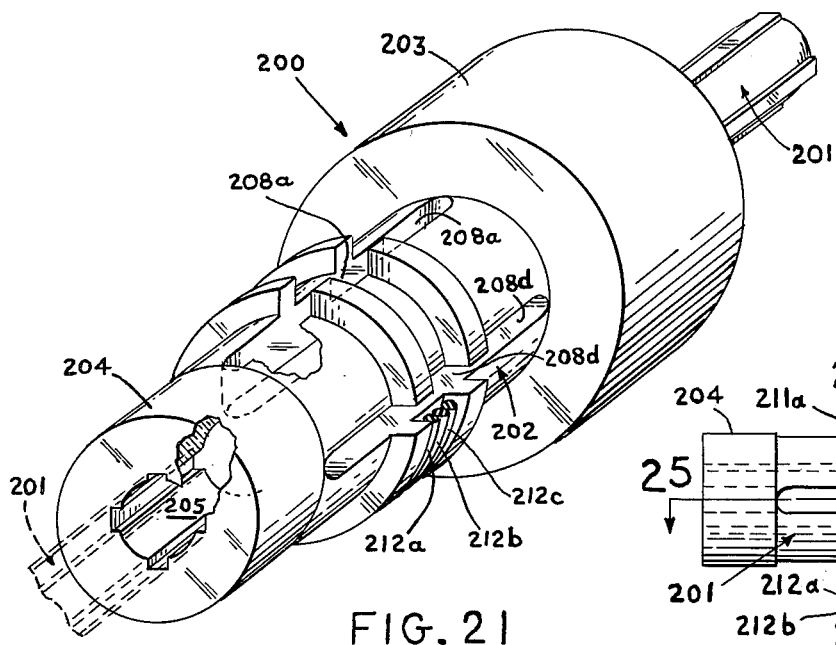
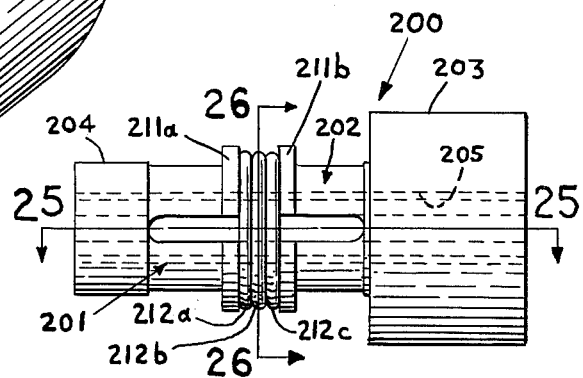
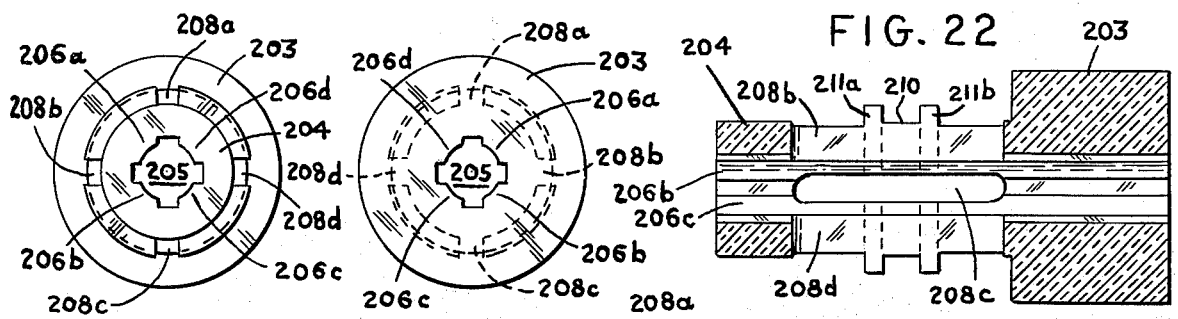
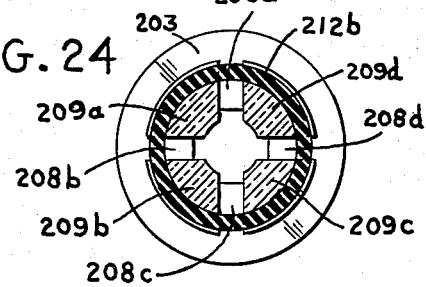
FIG. 21　FIG. 22　FIG. 23　FIG. 24　FIG. 25　FIG. 26

BALANCED COMPONENT OPERATIVE WITH AN ASSOCIATED SHAFT FOR RELATIVE POSITIONING MOVEMENT THEREBETWEEN

BACKGROUND OF THE INVENTION

This invention relates generally to mechanical positioning devices of the type which translate or transport a nut or the like component to and fro along a shaft or lead screw of finite length which has longitudinally extending transport elements such as grooves or helical threads therein and more particularly to a balanced component or nut to be mounted on and disposed in operative association with a shaft or lead screw of finite length having either longitudinal grooves, or single or multi-start helical threads wherein rotational play or linear backlash is prevented from developing between the coating elements regardless of the direction of movement of the balanced component or nut and which provides means to adjust the predetermined torque required to move the balanced component along the associated shaft and is self adjusting to take up wear so as to prolong the operating life of the balanced component or nut.

The term "balanced" when used herein in association with the improved component or nut in accordance with the present invention will mean that the torque required to produce relative movement between the shaft or lead screw and the component or nut will be the same regardless of the direction of movement.

The use of elongated shafts or lead screws of finite length with longitudinally extending grooves or longitudinally extending helical threads for transporting therealong or for relative movement therewith, of nuts or movable components with mating lands or threads is employed in many widely used products such as dictating machines, variable capacitors, variable resistors, potentiometers, and similar devices which require the movement of one element across another. For example in dictating machines a helically threaded shaft or lead screw will transport the recording stylus across a recording device such as a record or a belt. In the variable resistor, a contact arm is moved back and forth across a resistance coil.

The main problem in positioning devices of this type is the fact that it is difficult to obtain accurate positioning during this relative movement due to problems of rotational play and/or backlash between the given shaft or lead screw and the component or nut associated therewith. This is particularly so in positioning devices where the mating helical threads are made to standard interchangeable fits such as is called out in Mil-Spec 7742 or in U.S. Government Handbook No. 28.

Various efforts have been made in the prior art devices to overcome this problem such as is shown in U.S. Pat. No. 3,831,460, 3,656,358, 3,364,757 and 2,793,538.

In the present invention this problem is overcome by means of an improved balanced component which provides a compression means at a medial point transverse to the longitudinal axis of the balanced component so that it makes no difference which direction the component is moved during translation or transportation of the balanced component relative to a given shaft.

Additionally, however in the improved construction in accordance with the present invention the compression means can adjust the compression forces exerted at the medial section of the component so that a predetermined torque will be required to move the component to and fro along the associated shaft on which the component is mounted. Further, the compression forces will also act so as to take up any wear which may occur between the associated elements so that the accuracy of a positioning device which includes these elements will be prolonged.

SUMMARY OF THE INVENTION

Thus the present invention covers a balanced component for an elongated shaft with longitudinally extending transport means therealong wherein the balanced component has an end to end bore therethrough with longitudinally extending means in said bore forming matching elements for mounting the balanced component in close sliding fit engagement with the transport means on the elongated shaft, said balanced component having a plurality of circumferentially disposed longitudinally extending slots for defining therebetween a plurality of spaced connecting members which extend between the respective ends of the balanced component, and adjustable compression means medially of the respective ends of said component and transverse to the longitudinal axis thereof normally exert compressive forces at the medial section of each of said connecting members to urge the matching elements in the bore into force fit engagement with the associated transport means whereby a predetermined torque is required for relative movement between the balanced component and the associated shaft when these elements are in assembled relation.

Additionally a balanced component as above described wherein the slots may be parallel to the longitudinal axis of the balanced component, may be aligned parallel with the lead angle of the transport means on the associated shaft, or may have portions thereof parallel to the longitudinal line of the balanced component and portions parallel to the lead angle of the transport means on the elongated shaft.

Accordingly it is an object of the present invention to provide an improved balanced component for use on an associated shaft in which said component and said shaft may be moved to and fro relative to each other without rotational play or linear backlash.

It is another object of the present invention to provide an improved balanced component for use on an associated shaft in which either of said elements may be moved to and fro relative to each other in excess of predetermine torque forces exerted on either of said elements and wherein the elements are capable of maintaining a precise predetermined stable linear position in either direction of movement.

It is another object of the present invention to provide an improved balanced component for use on an associated shaft wherein self-adjusting means is provided for continually compensating for any wear which may occur between the matching elements on the balanced component and the transport means on the associated shaft so as to maintain and prolong the linear positioning accuracy of the associated elements.

It is another object of the present invention to provide a linear positioning device which includes an elongated shaft having transport means thereon and an associated balanced component having matching elements for operative association with the transport means of the shaft wherein the balanced component is capable of exercising a damping effect on the inertial forces present during relative movement in either direction of said balanced component and said elongated shaft.

With these and other objects and advantages the invention will become apparent from the following detailed description taken in conjunction with the accompanying drawings in which.

Figure 9:
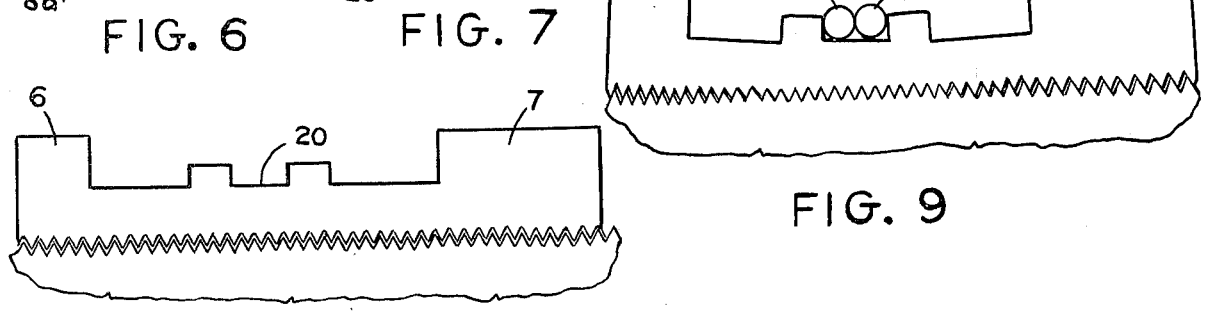
Figure 8:
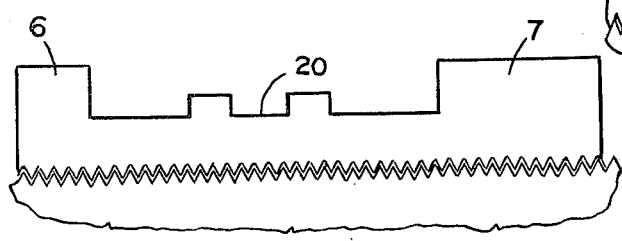

FIG. 8 is an enlarged schematic view of the improved component shown in FIGS. 1 to 7 in its initial relation in assembled position on a shaft without a medially disposed compression assembly, FIG. 9 is an enlarged schematic view of the improved component shown in FIGS. 1 to 7 assembled on a shaft with a medially disposed compression assembly after the component has completed its initial run-in period.

Figure 10:
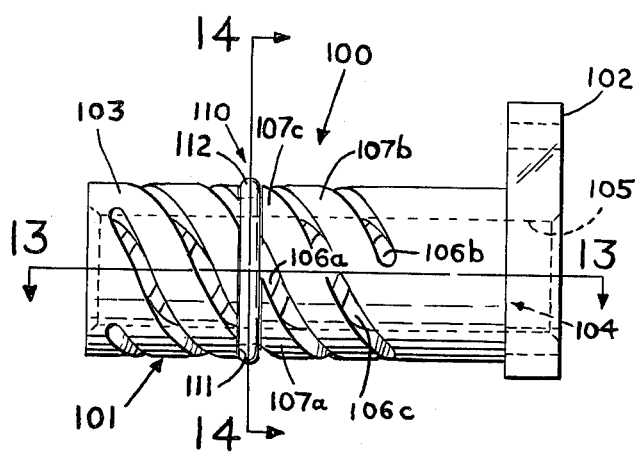

FIG. 10 is a side view of another form of balanced component in accordance with the invention.

Figure 11:
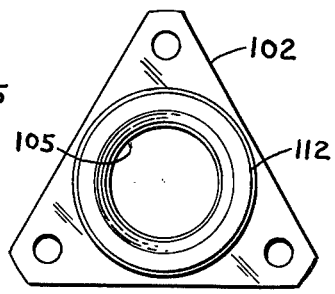

FIG. 11 is a right end view of the form of balanced component shown in FIG. 10.

Figure 12:
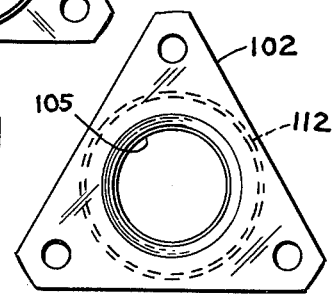

FIG. 12 is a left end view of the form of balanced component shown in FIG. 10.

Figure 13:
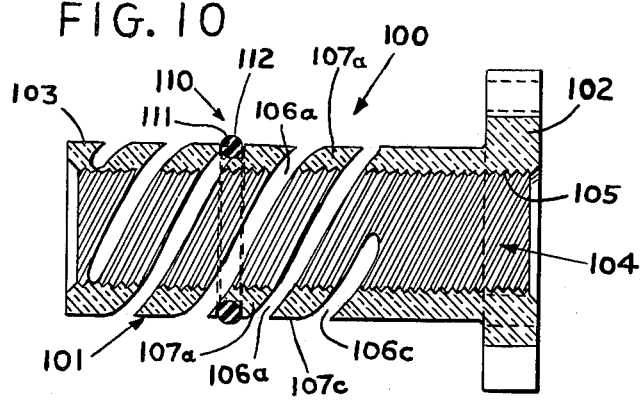

FIG. 13 is a longitudinal section taken on line 13—13 of FIG. 10.

Figure 14:
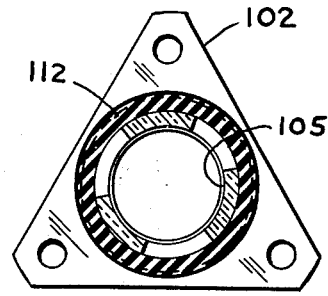

FIG. 14 is a cross-section taken on line 14—14 of FIG. 10.

FIG. 15 is a perspective view partly broken away of an elongated single start helically threaded shaft or lead screw with another form of balanced component thereon in accordance with the present invention.

FIG. 16 is a side view of the balanced component shown in FIG. 15.

FIG. 17 is a left end view of the balanced component shown in FIG. 16.

FIG. 18 is a right end view of the balanced component shown in FIG. 16.

FIG. 19 is a longitudinal cross-section taken on line 19—19 of FIG. 16.

FIG. 20 is a cross-section taken on line 20-2- of FIG. 16.

FIG. 21 is a perspective view partly broken away of an elongated shaft with longitudinally extending grooves with a form of the balanced component shown in FIGS. 15 to 20 modified to permit the component to be mounted for engagement on the grooved shaft.

FIG. 22 is a side view of the modified balanced component shown in FIG. 21.

FIG. 23 is a left end view of the modified balanced componenet shown in FIG. 22.

FIG. 24 is a right end view of the modified balanced componenet shown in FIG. 22.

FIG. 25 is a longitudinal section taken on line 25—25 of FIG. 22.

FIG. 26 is a cross-section taken on line 26—26 of FIG. 22.

In linear positioning devices an elongated shaft or lead screw and an associated component or nut are so joined that they may be disposed for relative movement therebetween in that the rotation of the shaft will act to move the component or nut to and fro along the shaft or conversely rotation of the component or nut will cause the shaft to move to and from relative thereto.

In order to accomplish this the elongated shaft or lead screw is provided with translational or transporting elements and the associated component or nut will be provided with corresponding matching elements to permit the component or nut to be mounted in close fit engagement with the translational or transporting elments on the elongated shaft or lead screw of the positioning device.

The translational or tranporting elements on the elongated shaft or lead screw may be of any suitable type several of which are well known such as helical threads of either the single or multi-start type with lead angles to meet the particular positioning requirements or longitudinally extending grooves or splines that may be v-shaped, in volute shaped, square shaped etc and either of which transport means permit an infinite member of incremental movements betweens these associated elements.

Thus referring to the drawings FIGS. 1 to 9 illustrate one preferred form of balanced component in accordance with the present invention generally designated 1 which is adapted for mounting and for movement to and fro along a multi-start helically threaded shaft or lead screw 2.

Multi-start helically threaded shaft or lead screw 2 is an elongated member having a plurality of helical threads as at 3$a$, 3$b$, 3$c$, etc. circumferentially disposed to extend along the length thereof. The helical threads are intended to be illustrated so that each are at the same high lead angle and thus parallel to each other.

Various techniques for rolling multi-start helically threaded shafts or lead screws with the various high lead angles are known as will be understood by those skilled in the art. Accordingly, the multiple start helically threaded shaft or lead screw 2 will not be more fully described.

Figure 1:
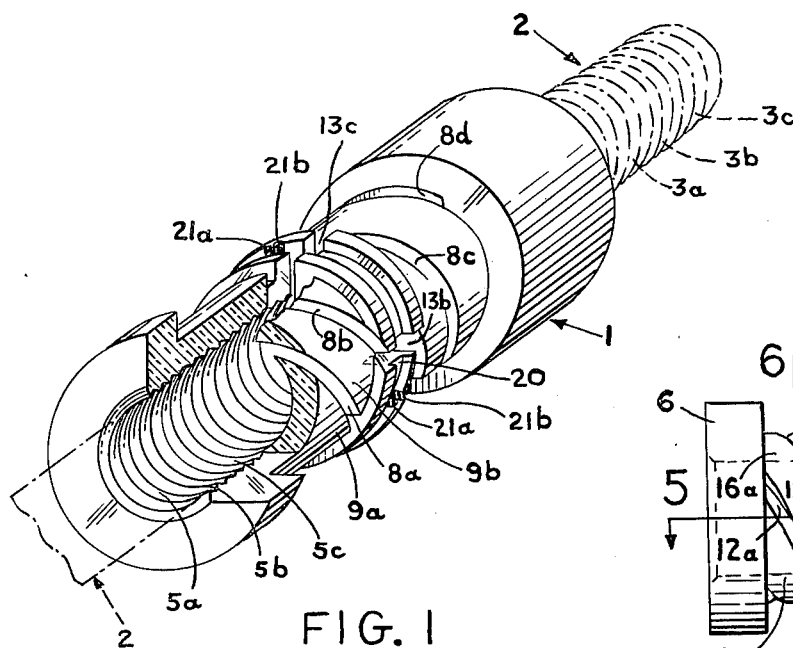
FIG. 1 is a perspective view partly broken away of an elongated multi-start helically threaded shaft or lead screw with one form of balanced component thereon in accordance with the present invention mounted thereon.

This construction however is noted because the balanced component or nut 1 in order to coact with the shaft or rod 2 must have a bore 4 having an equivalent number of multi-start helical threads as at 5$a$, 5$b$, 5$c$ etc. in and along the bore which extends from end to end through the nut 1 and the threads 5$a$, 5$b$, 5$c$, etc. must be at the same high lead angle as the threads 3$a$, 3$b$, 3$c$, etc. on the shaft or lead screw 2 so that when mounted on the shaft as shown in FIG. 1 the threads 5$a$, 5$b$, 5$c$, etc. will mate with and permit the component 1 to travel on the helical threads 3$a$, 3$b$, 3$c$, etc. when moved to and fro along the length of the elongated multiple start helically threaded shaft or lead screw 2. The nature of the engagement between these matching or mating elements and the means for varying the forces which maintain the same in engagement is more fully described below.

The multi-start helically threaded balanced component or nut 1 can be established, formed, molded or machined from a length of durable and machinable plastic bas stock or plastic bar stock or plastic like materials such as those sold under the trademark "Delrin A.F." or "Celcon" which products are made of fluorocarbon resin materials classified as acetal copolymers. Such plastics may for example be polytetrofluorethylene with a given filler or additive which provides the desired characteristics.

However, while these materials have been designated it will be understood by those skilled in the art that any type of plastic material or resinous material or the like type of material may be used for the balanced component or nut 1 or for any balanced component as hereinafter illustrated all in accordance with the present invention provided that the physical properties of such materials provide tensile strength, dimensional stability, a limited degree of resiliency for reasons that will appear clear hereinafter, chemical inertness, non-absorption of water, thermal stability and electrical characteristics for the given function and use.

It will be understood further that the plastic materials from which the balanced component or nut 1 is made must all have the required ductility to enable the mating helical threads at the required high lead angle to be formed therein and to provide the desired coefficient of friction for both sliding engagement between the mating threads on component 1 and the helical threads on the shaft 2 and for establishing proper compression engagement at the medial section of component 1, hereinafter more fully described, to overcome any problems of rotational play and/or linear backlash regardless of the direction of movement of the component on the shaft 2.

FIGS. 2 to 5 of the drawings further shown component or nut 1 as having a pair of spaced annular collars or flanges formed as at 6 and 7 the exterior wall of the component or nut 1 is milled, cut or formed with a generally smaller exterior diameter than the diameter of the spaced collars 6 and 7.

Figure 2:
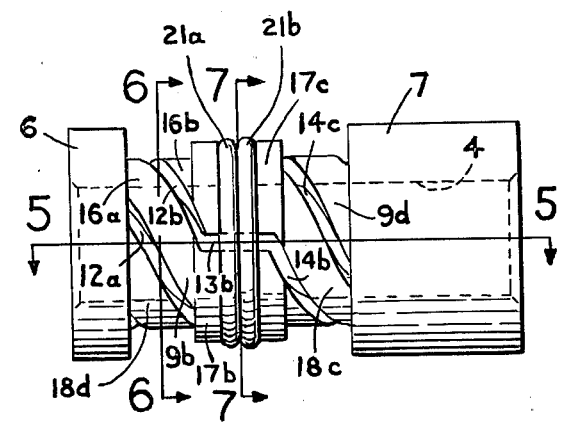
FIG. 2 is a side view of the balanced component shown in FIG. 1.
Figures 3, 4:
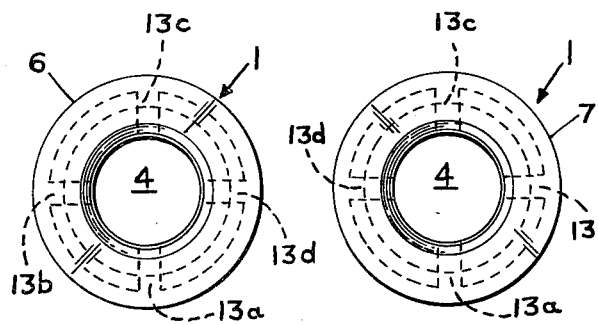
FIG. 3 is a right end view of the balanced component shown in FIG. 2.
FIG. 4 is a left end view of the balanced component shown in FIG. 2.
Figure 5:
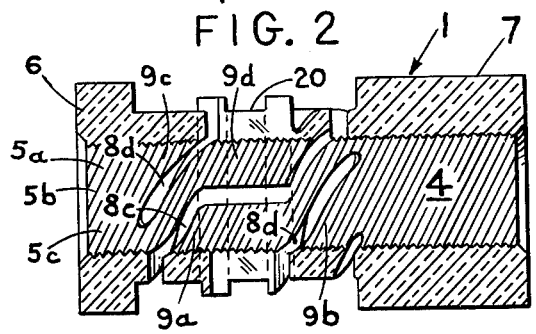
FIG. 5 is a longitudinal section taken on line 5—5 of FIG. 2.
Figures 6, 7:
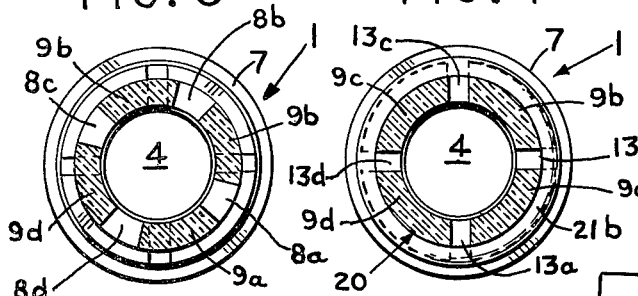
FIG. 6 is a cross section taken on line 6—6 of FIG. 2.
FIG. 7 is a cross section taken on line 7—7 of FIG. 2.

Component or nut 1 has a plurality of circumferentially disposed longitudinally extending slots or kerfs as at 8a, 8b, 8c, 8d etc., which are milled, cut or formed in this form of the invention so they extend through the wall of the component or nut 1 to define therebetween a plurality of elongated longitudinally extending connecting sections or members as at 9a, 9b, 9c, 9d etc. each connected at their opposite ends to the respective spaced collars 6 and 7, as is clearly shown in FIGS. 1, 2 and 5 of the drawings.

FIGSS. 1, 2 and 5 further show that each of the slots or kerfs 8a, 8b, 8c and 8d have a first end section as at 12a, 12b, 12c and 12d parallel to the lead angle of a first helical thread on the component or nut 1, a central section as at 13a, 13b, 13c and 13d parallel to the longitudinal axis of the respective component or nut 1 and the shaft 2, and a second end section as at 14a, 14b, 14c and 14d spaced and offset from the first section by the length of the parallel section at the lead angle of a second helical thread spaced from the first helical thread on the component or nut 1.

The parallel sections 13a, 13b, 13c and 13d etc. of the slots or kerfs 8a, 8b, 8c and 8d etc. are relatively short being approximately one third the length of the slots or kerfs and thus the parallel sections will be generally about three eight inches in the case of a component or nut mounted on a one half inch shaft or lead screw.

The significance of this construction is more apparent when reference is had to the connecting sections 9a, 9b, 9c and 9d etc. which lie between and are defined by the above described shape of the respective slots or kerfs on either side thereof.

Thus referring again to FIGS. 1, 2 and 5 of the drawings the respective members 9a, 9b, 9c and 9d also have first end sections as at 16a, 16b, 16c and 16d, central sections as at 17a, 17b, 17c and 17d etc.., and second end sections as at 18a, 18b, 18c and 18d which are offset in such a fashion that the first end section from a first connecting member lies on one side of a given slot and the second end section of the second or next adjacent connecting member lies on the opposite side of the slot in alignment with said first section of the first connecting member. The effect of this construction is that the helical threads on the first end section of the first connecting member and the helical threads of the second end section of the second or next adjacent connecting member will act or bear on opposite faces of the mating helical threads of the shaft or lead screw 2 when the balanced component 1 is assembled and operatively engaged with the helical threads of the shaft 2 as will now be described.

The present invention avoids backlash or relative rotation of the component or nut 1 with respect to the shaft or rod 2 regardless of the direction of relative movement between these elements by providing a compression assembly generally designated 20 at the medial section of the companent or nut 1 which forces the respective helical of the central sections of each coacting pair of connecting members into full engagement with both faces of the associated mating helical threads on the shaft or lead screw 2. FIG. 8 shows the component or nut 1 during initial engagement with the shaft 2 and FIG. 9 shows the same components after the "run-in" period.

FIG. 8 is intended to illustrate the closest possible interchangeable fit of the matched threads for the associated elements of the linear positioning device before compression forces are applied. For the male thread of the shaft or lead screw, a class 3A fit will be provided and for the female thread of the component or nut a class 3B fit will be provided. This is standard machine practice up to the present invention.

FIG. 9, however, is intended to show that in the present invention after a run in period of relatively short duration the interchangeable fit exceeds the prior art standard in that the device now has an interchangeable fit equivvalent to a class 4A fit for the male threads of the shaft and a class 4B fit for the female thread of the component or nut.

The tolerance with such last mentioned fit approach 0 particularly at the interengaging threads where the compression forces are exerted on the component or nut.

As a result of this advantageous arrangement, regardless of the direction of movement, the balanced component or nut in all forms of the present invention maintains substantially zero rotational play, and has no back-lash.

This intimate contact on both faces of the associated mating transport elements produced in the present invention is the key to overcoming the problems of the prior art devices and to provide the constant torque requirements regardless of the direction of rotation.

Compression assembly 20 for this form of invention includes an annular groove 21 formed and cut in the external face of the respective central sections 17a, 17b, 17c, 17d etc. of the connecting members 9a, 9b, 9c and 9d etc. Mounted therein are suitable resilient means generally designated 22a and 22b such as an O-ring or a garter spring which acts to compress the central section on the respective connecting members of the/balanced component or nut 1 as is clearly shown in the schematic sketches as at FIGS. 8 and 9 of the drawings wherein FIG. 8 shows the component 1 without the resilient means and FIG. 9 shows the component 1 with the resilient means.

The annular transverse groove 21 and the resilient members 22a and 22b mounted therein not only provide means for exerting compressive forces at the respective central sections of the connecting members on the component or nut 1 but additionally enable the compressive forces to be adjusted within limits because the annular transverse groove 21 can be sized to adjust the resiliency of the connecting members and the diameter and strength of the O-rings; garter springs or other compressive devices can be varied depending on the relative degree of compressive forces required.

Thus by making the annular transverse grooves 20 relatively shallow the connecting members will be proportionally stiffer than if these grooves are made relatively deep and if relatively small diameter and heavy O-ring is forced into the annular transverse groove 21 then depending on the relative stiffness, the connecting members will deflect at the central portions predetermined degree and cause the helical threads therein to engage more or less with the mating helical threads of the rod or shaft 2. This will regulate the torque required to move the component or nut 1 relative the shaft 2 by reason of the know coefficient of friction between the respective elements depending on the materials used.

If a larger diameter and lighter O-ring or other compressive device is utilized then a lesser torque will be required than would be the case where a heavier and smaller diameter O-ring or other compressive device is utilized.

In operation the component or nut 1 after being formed, threaded and slotted or kerfed as above described has the annular thransverse grooves formed therein and a resilient member selected in accordance with the predetermined torque required and the resilient member is connected in the annular grooves 20 as shown in FIGS. 2 and 5 of the drawings.

The component or nut 1 is then threaded onto the shaft or rod 2 and as shown by the schematic drawings at FIGS. 9 the helical threads on the contral portion of the connecting members of the component or nut 1 are caused to fully engage the associated helical threads on the shaft or rod 2 so that the helical threads of the respective first sections 16a, 16b, 16c and 16d of the connecting members 9a, 9b, 9c and 9d will engage the remote faces of the associated helical threads on the shaft or rod 2 on one side of the central section and the respective second sections 18a, 18b, 18c and 18d are caused to engage the remote faces of the associated helical threads on the shaft or rod 2 on the opposite side of the central section.

When so assembled the component or nut 1 is prevented from moving freely along the elongated shaft and when moved will be free of any relative rotation and/or backlash or lost motion between these elments.

Thus an improved linear positioning device is provided and an improved component or nut for use with said linear device has been described which is balanced to eliminate all/rotational play and/or backlach regardless of the direction that the component or nut is moved to and fro along the shaft or rod 2.

ALTERNATE FORM OF THE INVENTION

While in the first form of the invention the slots or kerfs 8a, 8b, 8c and 8d and the correspondingly shaped connecting members 9a, 9b, 9c and 9d etc. have been described as having sections thereon which are offset so that the respective sections do not contact the same helical threads, it is possible to obtain the same or a substantially similar result by cutting the slots or kerfs so that they are all parallel to the lead angle of the same helical threads the result of which will be to provide connecting members in which the helical threads thereon each contact the same helical threads on the associate shaft or lead/screw throughout the length thereof.

Thus referring to FIGS. 10 to 14 a component or nut 100 is shown as comprising an elongated cylindrical member which is also made of a plastic material of the same type above enumerated for the form of the invention shown in FIGS. 1 to 7 of the drawings and above described.

The balanced component or nut 100 in this form of the invention has a cylindrical body 102 with a uniform exterior diameter and at one end of the cylindrical body a triangular connecting flange 102 an end section 103 is provided which may have a varying length depending upon the particular application.

A bore 104 extends through the flange 102, the cylindrical body 101 and the end section 103 from end to end. Bore 104 has a diameter to permit the bore to be helically threaded as at 105 along its entire length so that the component can be mounted on as associated helically threaded shaft or lead screw not shown. The helical threads on the shaft or lead screw and the helical threads in the bore 104 will be formed or shaped at the same lead angle so that when assembled the helical threads 105 in the bore will match and threadibly engage the helical threads on the shaft or lead screw.

As above indicated this form of the invention differs from the form of the invention shown in FIGS. 1 to 7 in that the balanced component or nut 100 has its plurality of circumferentially disposed longitudinally extending slots or kerfs as at 106a, 106b and 106c milled, cut or formed so that they are each respectively parallel to the lead angle of the helical threads 105 in the bore 104 and further extend between the triangular connecting flange 102 and the end section 103 so that they define therebetween a plurality of elongated longitudinally extending connecting sections or members as at 107a, 107b and 107c each connected at their respective opposite ends to the triangular connecting flange 102 and the end section 103 as is clearly shown in FIGS. 10 and 13 of the drawings The connecting sections 107a, 107b and 107c will because of the parallel to each other and because there is more than one slot active to define the connecting sections or members, the adjacent sections will be offset from each other and the helical threads of one section and the helical threads of the next adjacent section on opposite sides of a compression assembly generally designated 110 disposed transversely about the medial section of the component 100 will act or bear on opposite faces of the mating helical threads of the associated shaft or lead screw when the balanced component 1 is assembled and operatively engaged thereon.

As in the first form of the invention described, this form of the invention avoids relative rotation and/or blacklash of the component or nut 100 with respect to the associated shaft or lead screw on which it is mounted regardless of the direction of relative movement between these elements by means of the compression assembly 110 which forces the respective helical threads of the central section of each of the connecting members into full engagement with both faces of the associated mating helical threads on the helically threaded shaft or lead screw, not shown, which come into engagement with the medial section of the component or nut 100.

The compression assembly includes an annular groove 111 formed or cut transverse to the longitudinal line of the cylinderical body 101 and in the medial section thereof. In this position, the annular groove is operatively associated with the respective connecting sections 107a, 107b and 107c as is shown in FIGS. 10, 12, 13 and 14 of the drawings.

Mounted in the annular groove is a suitable resilient means generally designated 112 such as an O-ring or a garter spring which acts to compress the central section of the respective connecting members and thus acts in the same manner as above described for a form of the invention shown in FIGS. 1 to 7 of the drawings.

The annular transverse groove 111 and the resilient member 112 not only provide means for exerting compressive forces at the respective central sections of the connecting members but additionally enable the compressive forces to be adjusted within limits because the annular transverse groove 21 can be sized to adjust the resiliency of the connecting members and the diameter and strength of the resilient members or compressive devices can be varied depending upon the relative degree of compressive force required to maintain the desired sliding engagement between the component or nut 100 and its associated helically threaded shaft or lead screw.

ONE AXIAL SLOT FORM OF THE INVENTION

In the forms of the invention above described, the slots or kerfs are cut so that they are either parallel to the lead angle of the helical threads or in part parallel to the helical threads and in part parallel to the axis of the component or nut and the shaft or lead screw on which the balanced component is mounted.

Where a single helical thread is formed on the shaft or lead screw or where the helical threads on the shaft or lead screw are less than 30° then it becomes difficult to form the slots or kerfs as described in the forms of the invention shown in FIGS. 1 to 7 and FIGS. 10 to 14 of the drawings.

The form of the invention shown in FIGS. 15 to 20 to the drawings is utilized where the shaft has a single helical thread thereon or helical threads with a lead angle of less than 30°.

Thus, referring to the drawings FIGS. 15 to 20 show that the balanced component or nut generally designated 150 in accordance with the invention includes a cylindrical body generally designated 151 with an end flange 152 at one end continuous therewith and an end section 153 at the end of the balanced component remote from the end flange 152.

As in the early forms of the invention a bore 154 extends end to end through the end flange 152, cylindrical body 151 and end section 153 and the bore has a diameter to permit the bore to be helically threaded as at 155 along its entire length so that the balanced component or nut can be mounted on an associated helically threaded shaft or lead screw shown by the phantomized lines at 156.

The helical threads in the bore 154 for this form of the invention have generally a lead angle of less than 30° and will be formed or shaped at the same lead angle as the helical threads on the shaft or lead screw 156 so that when assembled on the lead screw the helical threads 155 in the bore 156 will match and threadibly engage in sliding fit relationship the helical threads on the associated shaft or lead screw 156.

This form of the invention however differs from each of the earlier forms of the invention because it would not be possible to cut the slots or kerfs through the cylindrical body or member 151 parallel to the helical threads in the bore 154 because of the low lead angle thereof as will be understood by those skilled in the art.

In lieu of such slots or kerfs this form of the invention has its plurality of circumferentially disposed longitudinally extending slots or kerfs as at 157a, 157b, 157c and 157d milled, cut or formed so that they are each parallel to the axial line of the balanced component 150 and the helically threaded shaft or lead screw 156 all of which is shown in FIGS. 15 to 20 of the drawings.

FIGS. 15 to 20 further show that the slots or kerfs 157a, 157b, 157c and 157d extend through the wall of the cylindrical body 151 and are shorter than the distance between the respective end flange 152 and end member 153.

As will be clear from FIGS. 15, 16 and 19 of drawings these logitudinally extending slots or kerfs 157a, 157b, 157c and 157d define therebetween a plurality of elongated longitudinally extending connecting sections or members as at 158a, 158b, 158c and 158d each connected at their respective opposite ends to the end flange 152 and the end member 153.

Due to the parallel character of the slots or kerfs 157a, 157b, 157c and 157d the respective connecting sections 158a, 158b 158c and 158d will also be parallel to each other because there is more than one slot acting to define the connecting sections or members, all of which is clearly shown in FIGS. 15 to 20 of the drawings.

In order to establish the desired degree of engagement between the mating helical threads on the inner bore 154 and the helical threads on the associated shaft or lead screw 157, a compression assembly generally designated 160 is disposed transversely about the medial section of the balanced component 150 and will cause the medial sections of the connecting members 158a, 158b, 158c and 158d to the desired degree of engagement between the mating helical threads on the balanced component at the medial or central section thereof when it is in assembled position on the helically threaded shaft.

This engagement avoids relative rotation and/or backlash of the balanced component or nut 150 with respect to the associated helically threaded shaft or lead screw on which it is mounted regardless of the direction of relative movement between these elements due to the forces which are exerted by the compression assembly at this central section of each of the connecting members because of the full engagement with both faces of the associated mating helical threads on the helically threaded shaft or lead screw which come into engagement with the medial section of the connecting mmembers of the balanced component or nut 150.

The compression assembly for this form of the invention is similar to that above described for the form of the invention shown at FIGS. 1 to 7 of the drawings.

Thus the compression assembly 160 includes, an annular groove as at 161 which is formed and cut in the external face of the central sections of the connecting members 158a, 158b, 158c and 158d and spaced on either side of the annular groove are annular flanges as at 162a and 162b which have a diameter slightly in excess of the cylindrical body 151 of the balanced component 150.

Mounted in the annular groove 161 between the annular flanges 162a and 162b are suitable resilient means generally designated 163a, 163b and 163c such as elastomeric O-rings which act to compress the central section of the respective connecting members of the balanced component or nut 1 as is clearly shown in FIGS. 15, 19 and 20 of the drawings.

Although elastomeric O-rings are illustrated as the compression mechanism is the compression assembly 150 it will be understood that garter springs or other suitable resilient means can be utilized without departing from the scope of the present invention.

As in the form of the invention shown in FIGS. 1 to 7 of the annular transverse groove 161 and the resilient compression members 163a, 163b and 163c mounted therein not only provide means for exerting compressive forces at the respective central sections of the connecting members on the balanced component or nut 1 but additionally enable the compressive forces to be adjusted between limits because the annular transverse groove 161 can be sized to adjust the resiliency of the connecting members and the diameter and strength of the associated resilient members mounted therein can be varied depending upon the relative degree of compressive forces required for the desired degree of engagement between the matching helical threads of the balanced component or nut 1 and its associated helical shaft or lead screw on which it is mounted.

It is thought to be obvious that such compression assembly will not only serve to establish the desired degree of compressive forces required but additionally will act to take up any wear that may occur between the matching helical threads of the balanced component or nut 150 and its associated helically threaded shaft or lead screw during the use and operation of these components.

The assembly and operation of this form of the invention is identical with that of the forms of the invention above described and accordingly when so assembled the balanced component or nut 150 is prevented from moving freely along the associated helically threaded shaft or lead screw and when moved will be free of any relative rotation and/or backlash or lost motion between these elements.

ANOTHER EXIAL SLOT FORM OF THE INVENTION

FIGS. 21 to 26 show a still further form of the invention in which the slots or kerfs are disposed parallel to the longitudinal axis of the balanced component or nut and the associated shaft or lead screw on which the balanced component or nut is mounted.

In this form of the invention the balanced component or nut generally designated 200 is utilized where the associated shaft longitudinally extending grooves.

Thus referring to the drawings FIGS. 21 to 26 show that the balanced component or nut 200 is substantially identical to that of the balanced component or nut 150 shown in FIGS. 15 to 20 of the drawings and that the said balanced component or nut 200 is mounted on an associated shaft or lead screw generally designated 201 which has a plurality of longitudinally extending grooves 202.

The balanced component or nut 200 will therefore include a cylindrical body generally designated 202 with an end flange 203 at one end continuous therewith and an end section 204 at the end of the balanced component remote from the end flange 202.

A bore 205 extends through the end flange 203, the cylindrical body 202 and the end section 204 from end to end and has a diameter to permit the bore to be milled, cut or formed so that it forms a plurality of circumferentially disposed lands as at 206a, 206b, 206c and 206d along its entire length as is shown in FIGS. 21, 23, 24 and 26 of the drawings.

The lands 206a, 206b, 206c and 206d will be so formed that the balanced component or nut 200 can be mounted on the associated longitudinally grooved shaft or lead screw 201 so that when assembled the lands 206 in the bore 205 will match and engage the axial grooves/202 and will permit the balanced component or nut 200 and the associated longitudinally grooved shaft or lead screw 201 to be moved relative to each other.

As in the form of the invention shown in FIGS. 15 to 20 of the drawings the balanced component 200 will also have a plurality of circumferentially disposed longitudinally extending slots or kerfs as at 208a, 208b, 208c and 208d which are milled, cut or formed so that they extend through the wall of the balanced component or nut 200 and lie parallel to the longitudinal axis of the balanced component or nut 200 and the associated longitudinally grooved shaft or lead screw 201.

These slots or kerfs 208a, 208b, 208c and 208d lie between the end flange 202 and end member 203 so that they define therebetween a plurality of elongated longitudinally extending conneccting sections or members as at 209a, 209b, 209c and 209d each connected at their respective opposite ends to the end flange 202 and end member or section 203 as is clearly shown in FIGS. 15, 16 and 19 of the drawings.

Because of the manner in which the connecting sections are formed they will also be parallel to each other and although the slots are shown as lying in alignment with the portions of the cylindrical body 202 between the lands 206a, 206b, 206c and 206d it is clear that the slots or kerfs could also open or extend through the cylindrical body 202 at the lands instead of between them. However where the slots pass through the cylindrical wall will define the structure of the respective connecting sections formed therebetween and the resiliency of the respective connecting sections will thus be affected by the relative thickness of the structure as thus formed.

This form of the invention as in all the earlier forms of the invention includes a compression assembly for exerting the required force for engagement between the lands 208a, 208b, 208c and 208d and the grooves 201a, 201b, 201 c and 201d on the associted shaft or lead screw 201.

Thus the compression assembly includes an annular groove as at 210 which is formed and cut into the external face or surface of the cylindrical body 202 about the central or medial protion of each of the connecting sections or members 208a, 208b, 208c and spaced annular flanges as at 211a and 211b will be provided on the sides of the annular groove 210 to permit suitable resilient means designated 212a, 212b and 212c to be mounted in the annular groove 210 between the annular flanges 211a and 211b.

The resilient means can be elastomeric O-ring as illustrated or a garter spring or other compressive device which can act to compress the central section of the respective connecting members and thus provide the required force for promoting engagement between the lands and the grooves as above described.

In this form of the invention the balanced component or nut 200 is assembled in the same manner as above described for the form of the invention shown in FIGS. 1 to 7 of the drawings for the when so assembled on an associated longitudinally grooved shaft or lead screw the balanced component or nut 1 will be prevented from moving along the associated shaft and when moved will be free of any relative rotation and/or backlash or lost motion between these elements.

The centrally exerted force will also take up any wear that may occur between the lands on the balanced component or nut 1 and the associated longitudinally grooved shaft 201.

Thus there has been descirbed various forms of improved linear positioning devices and more particularly to improved balanced components or nuts each having a compression assembly centrally disposed thereon for providing a predetermined force for regulating the relative engagement between the transport means on the associated shaft of the linear positioning device and the matching means in the bore of the balanced component or nut for permitting matching engagement between the component and the associated shaft in assembled position so that rotational play and/or backlash is avoided and play due to wear during normal use of the linear positioning device is automatically adjusted so as to obtain maximum usage and long life for such linear postioning devices utilizing the balanced component or nuts made in accordance with the inventin as above described.

While the foregoing description illustrates various preferred embodiments of apparatus and systems in accordance with the present invention, it will be appreciated that certain changes and modificatins may be made in the structure of these disclosed arrangements without departing from the spirit and scope of the invention and that the same is defined by the claims as hereinafter set forth.

What is claimed is:

1. A component for use on a shaft having transport means thereon comprising,
   a. a member having a bore therethrough,
   b. matching transport means formed in the member substantially along the length of said bore to permit said component to be mounted for movement to and fro relative the transport means of the associated shaft,
   c. a plurality of circumferentially spaced slots cut through the wall of said member each generally having a length less than the member.
   d. said slots defining a plurality of circumferentially spaced connecting members on the member each of which connecting members is disposed between an adjacent pair of slots, and
   e. means about the medial section of said component and transverse to the longitudinal line thereof for exerting compressive forces on the connecting members and to provide a predetermined engagement forces for balanced relative movement between the matching transport means or the component and the transport mean on the associated shaft.

2. In the component as claimed in claim 1 wherein the means for exerting compressive forces includes, adjustable means for providing the predetermined engagement forces for the desired balanced component.

3. In the component as claimed in claim 2 wherein the adjustable means for providing the prdetermined engagement forces for the desired balanced movement comprises,
   a. sized annular groove means about the medial section of the member, and
   b. sized resilient means about the medial section and positioned to engage in the annular groove means, 4. In the component as claimed in claim 3 wherein,
   a. said annular groove is sized to provide a predetermined width, and has a depth to adjust the resiliency of each of the connecting members,
   b. said resilient means sized to fit in the predetermined width of the annular groove and also sized to exert the required circumferential force for effecting the predetermined engagement forces for the desired balanced relative movement.

5. In the component as claimed in claim 4 wherein the resilient means consists of at least one 0-ring.

6. In the component as claimed in claim 2 wherein at least a portion of the slots in the wall of the member are parallel to the matching transport means in the member.

7. In the component as claimed in claim 2 wherein at least a portion of the slots are in alignment with the axial line of the component.

8. In the component as claimed in claim 2 wherein,
   a. the medial section of each of the slots are parallel to the axial line of the member,
   b. the respective end sections on opposite sides of the medial section of each of the slots are in alignment with the matching transport means in the member, and
   c. the means for exerting compressive forces is about the medial section of each of the respective connecting members between the medial sections of the respective slots.

9. In the component as claimed in claim 2 wherein each of the slots are in alignment with the matching transport means formed in the member of the component.

10. In the component as claimed in claim 2 wherein each of the slots are in alignment with the axial line of the component.

11. A component for use on a shaft having at least one helical thread thereon with a predetermined lead angle comprising,
    a. an elongated member having a bore therethrough,
    b. matching thread means extending substantially end to end in said bore having the same lead angle as the lead angle of the associated shaft to permit said component to be mounted for movement to and fro on said at least one helical thread of the associated shaft,
    c. a plurality of circumferentially spaced slots cut through the wall of said elongated member and having a length less than the length of the elongated members,
    d. said spaced slots defining a plurality of connecting members on the elongated member each one of said connecting members disposed between an adjacent pair of slots, and e. means about the medial section of said elongated member and transverse to the longitudinal line thereof for exerting compressive forces on the connecting members when they are assembled on said associated shaft and to provide a predetermined engagement force for balanced relative movement between the component and the associated shaft.

12. In a component as claimed in claim 11 where a means for exerting compressive forces includes, adjustable means for providing the predetermined engagement forces for the desired balanced movement.

13. In the component as claimed in claim 12 wherein the adjustable means for providing the predetermined engagement forces for the desired balanced movement comprises,
   a. sized annular groove means about the medial section of the elongaged member, and
   b. sized resilient means operatively associated with the annular groove means.

14. In the component as claimed in claim 13 wherein,
   a. said annular groove is sized to provided a predetermined width, and has a depth to adjust the resiliency of each of the connecting members, and
   b. said resilient means to fit in the predetermined width of the annular groove and also sized to exert the required circumferential force for effecting the predetermined engagement forces for the desired balanced relative movement.

15. In the component as claimed in claim 14 wherein the resilient means consists of at least one O-ring.

16. In a component as claimed in claim 12 wherein.
   a. each of said slots have the at least the medial portion thereof substantially parallel to the axial line of the component,
   b. each of the respective end sections on opposite sides of the medial portion of said slots substantially parallel to the matching thread means in the elongated member and,
   c. the means for exerting compressive forces is disposed about the medial section of the connecting members between respective adjacent slots.

17. In a component as claimed in claim 12 wherein each of said slots are in alignment with the matching threaded means on the elongated member.

18. In the component as claimed in claim 16 wherein he adjustable means for providing the predetermined engagement forces for the desired balances movement comprises,
   a. sized annular groove means about the medial section of the elongated member, and
   b. sized resilient means operatively associated with the annular groove means.

19. In the component as claimed in claim 18 wherein the resilient means consists of at least one O-ring.

20. In a component as claimed in claim 12 wherein the lead angle of the at least one helical thread is more than 30°.

21. In a component as claimed in claimm 12 wherein the at least one helical thread has a lead angle of less than 30°.

22. In a component as claimed in claim 21 wherein,
   a. each of said slots is disposed parallel to the axial line of the component, and
   b. the means for exerting compressive forces is disposed about the medial section of the connecting members between respective adjacent slots.

23. A component for use on a shaft having longitudinally extending grooves, splines or the like therein comprising,
   a. an elongated member having a bore therethrough,
   b. matching land means extending substantially end to end in said bore sized to permit said component to be mounted in said longitudinally extending grooves, splines and the like on side associated shaft for relative movement therebetween,
   c. a plurality of circumferentially spaced slots cut through the wall of said elongated member having a length less than the length of the elongated member.
   d. said spaced slots defining a plurality of connecting members on the elongated member each one of said connecting members disposed between an adjacent pair of slots, and
   e. means about the medial section of said elongated member and transverse to the longitudinal line thereof for exerting compressive forces on the connecting member when they are assembled on said associated shaft and to provide a predetermined engagement force for balanced relative movement between the component and the associated shaft.

24. In a component as claimed in claim 23 wherein the means for exerting compressive forces includes, adjustable means for providing the predetermined engagement forces for the desired balanced relative movement.

25. In a component as claimed in claim 24 wherein the slots are disposed in alignment with the axial line of the component.

26. In a component as claimed in claim 25 wherein the adjustable means for providing the predetermined engagement forces for the desired balanced relative movement comprises,
   a. sized annular groove means about the medial section of the connecting members, and
   b. sized resilient means section and positioned to engage in the annular groove means.

27. In a linear positioning device,
   a. an elongated member having transport means thereon,
   b. a component having, a bore, and matching transport means in said bore to permit said component to be mounted.
   c. a plurality of circumferentially disposed slots cut through the wall of said component and having a length less than the length of the component so as to define therebetween a plurality of circumferentially spaced connecting members.
   d. means in the medial section of said component and transverse to the axial line thereof for exerting compressive forces on the connecting members whereby rotational play therebetween is prevented irrespective of the direction of relative movement.

28. In the component as claimed in claim 27 wherein the means for exerting compressive forces includes,
   a. adjustable means for providing the predetermined engagement forces for the desired balanced relative movement.

29. In a linear positioning device.
   a. an elongated member having at least one helical thread having a predetermined lead angle formed thereon,
   b. a component having, a bore, and helical thread means in said bore disposed at the same lead angle as said at least one helical thread on said elongated member to permit said component to be threadibly mounted thereon for relative movement between the component and the elongated member, c. a plurality of circumferentially disposed slots cut through the wall of said component and having a length less than the length of the component so as to define therbetween a plurality of circumferentially spaced connecting members.

d. said slots having at least a portion thereof at the same lead angle as said at least one helical thread on the elongated member and said component, and e. means in the medial section of said component and transverse to the axial line thereof for exerting compressive forces on the connecting member whereby rotational play is prevented irrespective of the direction of relative movement between said component and said elongated member.

30. In a linear positioning device as claimed in claim 29 wherein the means in the medial section of said component for exerting compressive forces includes adjustable means for providing the predetermined engagement forces for the desired balanced relative movement.

31. In a linear positioning device as claimed in claim 30 wherein the adjustable means for providing the predetermined engagement forces of the desired balanced relative movement comprises, a. sized annular groove means about the medial section of the component, and b. sized resilient means about the medial section and positioned to engage in the annular groove means.

* * * * *

UNITED STATES PATENT AND TRADEMARK OFFICE
CERTIFICATE OF CORRECTION

PATENT NO. : 4,002,083
DATED : January 11, 1977
INVENTOR(S) : Harry Glicken

It is certified that error appears in the above-identified patent and that said Letters Patent are hereby corrected as shown below:

Column 2, line 50, cancel "predetermine", and insert --predetermined--.

Column 3, line 64, cancel "componenet" and insert --component--.

Column 3, line 66, cancel "componenet" and insert --component--.

Column 4, line 9, cancel "from" and insert --fro--.

Column 4, line 24, cancel "in volute" and insert --involute--.
Column 4, line 26, cancel "member" and insert -- number --.
Column 4, line 66, cancel "bas" and insert --bar--.

Column 5, line 30, cancel "shown" and insert --show--.

Column 5, line 32, after "at 6 and 7", insert --at the respective ends thereof. Between the spaced collars 6 and 7:--

Column 5, line 46, cancel "FIGSS" and insert --FIGS--.

Column 5, line 61, cancel "three-eight inches" and insert --three-eights of an inch--.

UNITED STATES PATENT AND TRADEMARK OFFICE
CERTIFICATE OF CORRECTION

PATENT NO. : 4,002,083
DATED : January 11, 1977
INVENTOR(S) : Harry Glicken

It is certified that error appears in the above—identified patent and that said Letters Patent are hereby corrected as shown below:

Column 6, line 25; cancel "companent" and insert --component--

Column 6, line 26, after "helical" insert --threads--.

Column 6, line 45, cancel "equivvalent" and insert --equivalent--.

Column 7, line 2, before "balanced" take out --/--.

Column 7, line 24, before "predetermined" insert --a--.

Column 7, line 29, cancel "know" and insert --known--.

Column 7, line 37, cancel "aboved" and insert --above--.

Column 7, line 38, cancel "thransverse" and insert --transverse--.

Column 7, line 45, cancel "FIGS" and insert --FIG--.

Column 7, line 45, cancel "contral" and insert --central--.

Column 7, line 64, after "all" cancel --/--.

Column 8, line 14, after "lead" cancel --/--.

Column 8, line 32, cancel "as" and insert --an--..

UNITED STATES PATENT AND TRADEMARK OFFICE
CERTIFICATE OF CORRECTION

PATENT NO. : 4,002,083
DATED : January 11, 1977
INVENTOR(S) : Harry Glicken

It is certified that error appears in the above-identified patent and that said Letters Patent are hereby corrected as shown below:

Column 8, line 55, after "parallel" insert --relation of the slots or kerfs 106a, 106b and 106c also be parallel--.

Column 8, line 56, cancel "active" and insert --acting--.

Column 10, line 67, cancel "mmembers" and insert --members--.

Column 11, line 20, cancel "is" and insert --in--.

Column 11, line 56, in the sub-title, cancel "EXIAL" and insert --AXIAL--.

Column 11, line 66 after "associated shaft" insert --or lead screw has transport means thereon in the form of--.

Column 12, line 24, before "202" cancel --/--.

Column 12, line 39, cancel "conneccting" and insert --connecting--.

Column 13, line 14, after "drawings" cancel "for the" and insert --and--.

Column 13, line 40, cancel "tin" and insert --tion--.

UNITED STATES PATENT AND TRADEMARK OFFICE
CERTIFICATE OF CORRECTION

PATENT NO. : 4,002,083
DATED : January 11, 1977
INVENTOR(S) : Harry Glicken

It is certified that error appears in the above-identified patent and that said Letters Patent are hereby corrected as shown below:

Column 13, line 44, cancel "modificatins" and insert --modifications--.

Column 13, line 68, before "predetermined" cancel "a".

Column 15, line 34, before "at least", cancel "the".

Column 15, line 48 before "adjustable means", cancel "he" and insert --the--.

Column 15, line 49, cancel "balances" and insert --balanced--.

Column 15, line 60, before "12", cancel "m"

Column 16, line 8, before "associated", cancel "side" and insert --said--.

Column 17, line 7, cancel "therbetween" and insert --therebetween--.

Signed and Sealed this

First Day of May 1979

[SEAL]

Attest:

RUTH C. MASON
Attesting Officer

DONALD W. BANNER
Commissioner of Patents and Trademarks